S. NAKAGAWA.
STORM AND SUN SHIELD.
APPLICATION FILED JULY 27, 1920.
1,380,829.
Patented June 7, 1921.
2 SHEETS—SHEET 1.
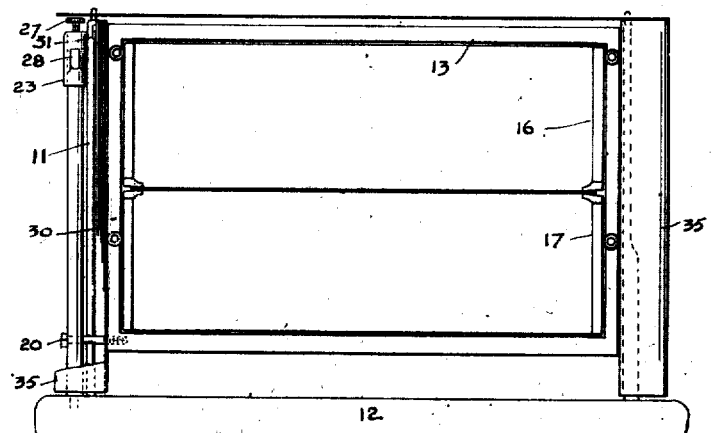
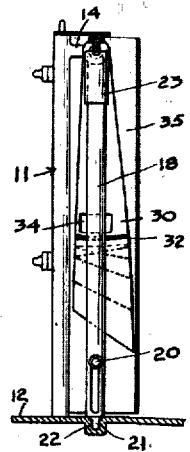
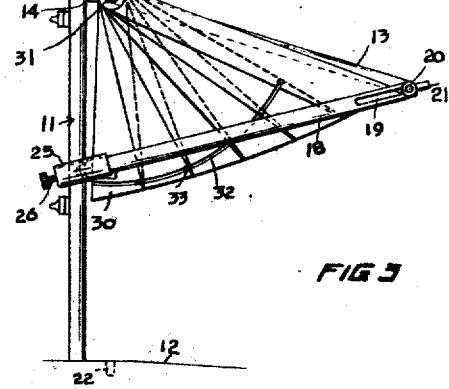
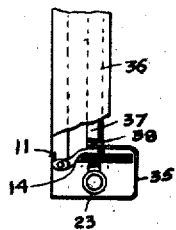
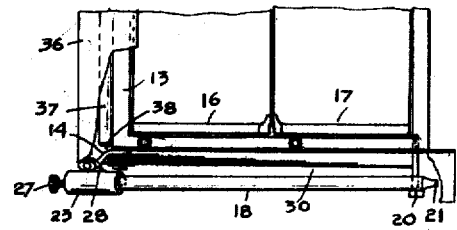
INVENTOR
S. NAKAGAWA
ATTYS.

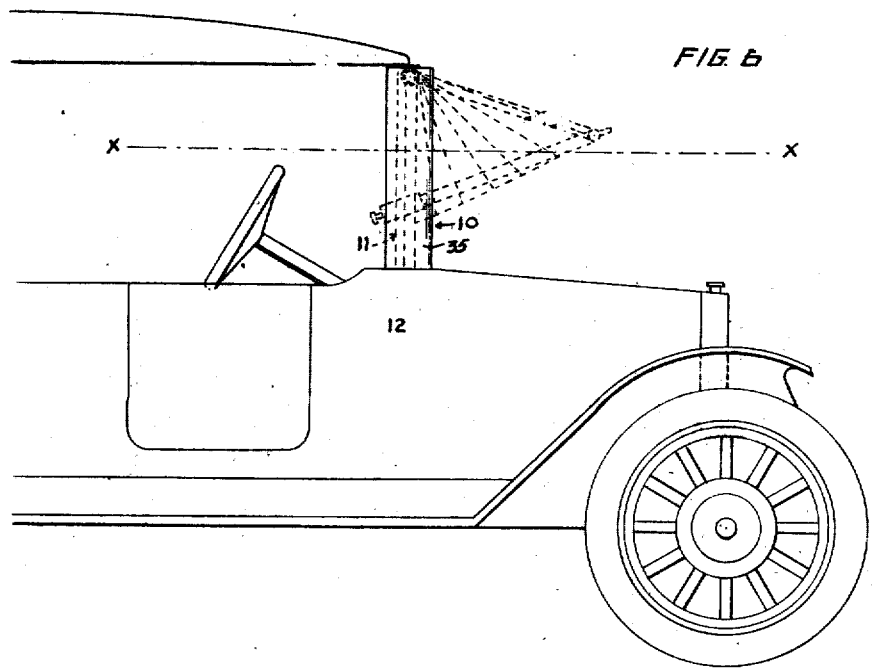
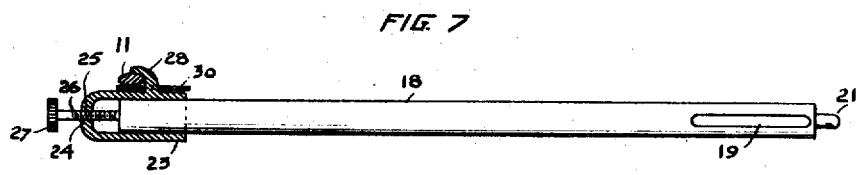
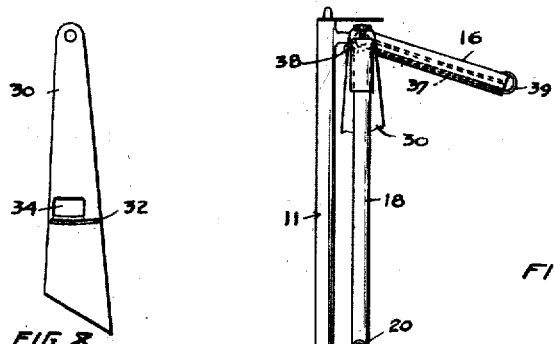
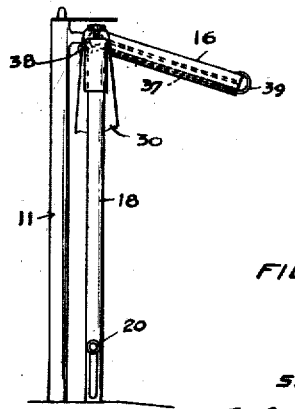
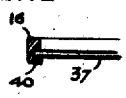

UNITED STATES PATENT OFFICE.

SHOICHI NAKAGAWA, OF SAN JOSE, CALIFORNIA.

STORM AND SUN SHIELD.

1,380,829.    Specification of Letters Patent.    Patented June 7, 1921.

Application filed July 27, 1920. Serial No. 399,265.

*To all whom it may concern:*

Be it known that I, SHOICHI NAKAGAWA, a subject of the Emperor of Japan, residing at San Jose, in the county of Santa Clara and State of California, have invented new and useful Improvements in Storm and Sun Shields, of which the following is a specification.

This invention relates to improvements in automobiles and more particularly to a storm and sun shield for automobiles.

The primary object of the invention is to provide a storm and sun shield which, in the form of an attachment capable of being readily attached to an automobile so as to operate in conjunction with the ordinary wind shield thereof, will serve to prevent wind and rain from blowing into the automobile and at the same time permit of clear vision through the shield; and which will also serve in driving against the sun to prevent the glare of the sun from interfering with the driver's vision.

An object of the invention is to provide a shield of the character described which is comparatively simple as to construction, inexpensive, reliable in use and which may be incorporated with an automobile without necessitating any material change in the construction of the automobile.

The invention possesses other advantages and features, some of which, with the foregoing will be set forth at length in the following description wherein I shall outline in full that form of the invention which I have selected for illustration in the drawings accompanying and forming a part of the present specification. In said drawings, I have shown one form of the construction of my invention, but it is to be understood that I do not limit myself to such form, since the invention as expressed in the claims may be embodied in a plurality of forms.

Referring to the drawings:

Figure 1 is a fragmentary front elevation of an automobile, showing my improved shield thereof in front of the ordinary wind shield and in inoperative position.

Fig. 2 is a side elevation of the shield of this invention, showing it attached to the ordinary wind shield and a part of the housing or casing therefor in section.

Fig. 3 is a side elevation of the shield of this invention, showing it in position as it would appear as when in use as a storm shield.

Fig. 4 is a fragmentary top plan view of the shield in the position shown in Fig. 3.

Fig. 5 is a fragmentary top plan view of one side of the shield, showing the manner of housing the side edges thereof.

Fig. 6 is a side elevation of an automobile, showing it provided with the shield of this invention and in position for use as a storm shield.

Fig. 7 is a top plan view partly in section, of a detail of this invention, particularly illustrating the manner of supporting the shield of this invention in storm position.

Fig. 8 is a detail top plan view of one of the side member for the shield.

Fig. 9 is a fragmentary side elevation of an automobile showing the shield of this invention partly in section and in position for use as a sun shield.

Fig. 10 is a fragmentary sectional view showing the means for guiding the curtain and preventing wind from rattling same.

Referring to the present embodiment of the invention as shown in the drawings, the combined sun and storm shield of this invention is generally designated 10, is shown attached to the ordinary wind shield 11 of the automobile 12 and is disposed in front of the ordinary wind shield so as to be movable into its various positions for use, as will later be more fully described.

In carrying out the invention, I provide a shield frame 13 of substantially the same dimensions as the frame for the main wind shield 11 but which is of rectilinear outline. The upper ends of the frame 13 are suitably hingedly connected to a suitable bracket 14 of the main wind shield, said frame 13 being disposed in outwardly spaced parallel relation to the main frame of the wind shield. Mounted in the frame 13 is an upper wind shield section 16 and a lower section 17 arranged to be moved in and out relative to one another. The entire shield may be swung outwardly into the position shown in Figs. 3 and 6 and adjusted as to its outward extension so as to act as a storm shield to prevent rain from being blown in through the main wind shield 12.

To provide for holding the shield 10 in normal upright position and for supporting it in outwardly extended and inclined position, there are provided on opposite sides of the frame 13 bars or rods 18. These rods 18 are longitudinally slotted, as at 19, at their lower ends. Screws or other fastening elements 20 are inserted through the slots 19 and secured to the side members of the frame 13 so as to slidably and pivotally attach the bars 18 to said frame. The lower ends of the bars 18 are reduced as at 21 and adapted to extend into apertures 22 therefor provided in parts of the automobile body adjacent to the lower end of the frame 13. Thus, when the bars 19 at their lower reduced ends are received in said openings, the shield 10 is rigidly supported in normal position.

The upper ends of the bars are provided with means for attaching and supporting said upper ends to the sides of the main wind shield 11.

The shutter plates are made in different lengths so that when extended so as to partly overlap one another in fan like form, they will inclose the sides of the shield between the bars 18 and wind shield sections 16 and 17 as shown particularly in Fig. 3 of the drawings. To prevent the shutter plates from being moved into position past that of a slight overlapping engagement, each plate is provided with an arcuate slot 32 adjacent to its lower end and which extends transversely of the lower plate. Adjacent to the rear edge of each plate is a pin 33, and the pin of one plate operates in the slot of the next adjacent plate. When the shutter plates are collapsed, they lie in small compass in line with the frames of the wind shield, as shown in Fig. 2. The innermost plate 30 is provided with a notch or opening 34 of sufficient size to permit the hook portion 28 of each sleeve to be extended therethrough. By this arrangement the hook 28 is supported by the innermost plates 30 and in this way the bars 18 are prevented from sliding downwardly relative to the sides of the main wind shield frame.

By tightening the screws 26, the sleeves 23 are forced rearwardly and provide for a binding engagement between the hooks 28 and the sides of the main wind shield frame.

It will thus be apparent from the foregoing description and accompanying drawing that it is possible with the device of this invention to readily adjust the shield 10 so that it will serve as a storm shield or may be disposed in normal position such as shown in Figs. 1 and 2 of the drawings. This means includes sleeves 23 rotatably mounted upon the upper ends of the bars 18. The closed ends 24 of the sleeves are provided with screw threaded openings 25 therein for reception of a screw 26. The screws 26 are provided with knurled ends 27 and the opposite end thereof abuts the upper ends of the rods 18. Thus by turning the screws the position of the sleeve relative to the bars 18 may be adjusted. Each sleeve is provided with a curved projection or hook 28 which is adapted to engage the sides of the frame of the main wind shield 12 as shown particularly in Fig. 7 of the drawings. To use the device of this invention as a storm shield, the wind shield sections 17 and 16 together with the frame 13 thereof are moved into the downwardly and outwardly inclined position shown in Figs. 3 and 6 of the drawings, so that the lower edge of the frame 13 is disposed at a point just above the line of sight of the driver of the vehicle, which line is indicated at X. To permit of this disposition of the shield 10, it is first necessary to loosen the screws 20 which hold the lower ends of the bars in engagement with the openings 22 in the car body. When this is done, the bars 18 are lifted out of engagement with said openings and the entire shield is free to be swung into operative position. The bars 18 are then swung on their pivots so that the ends thereof carrying the sleeves 23 are disposed for engagement with the sides of the main wind shield frame. By turning the sleeves 23, the hook portions 28 are caused to engage the main wind shield frame as shown in Fig. 7 and the bars 18 thus support the shield 10 in position.

Means is provided for supporting the bars 18 against slipping downwardly on the frame for the main wind shield 11 whereby the storm shield is securely held in storm shielding position. Mounted upon each side of the shield 10 are a plurality of shutter plates 30 which are of substantially rectilinear outline and mounted one upon the other, said shutters having a common pivot 31 at their upper ends, said pivot being made with the extension or bracket 14. With the side members 30 in place all possibility of rain being blown onto and collecting on the main wind shield or rain blowing through the shield and into the car is overcome.

There are provided casings 35 adapted to embrace the sides of the shields 10 and 11, as shown in Figs. 1, 5 and 6 in the drawings. The top of the main wind shield frame supports the extending plate 36 which extends over the space between the shields 10 and 11. The casings 35 are removable and are not used when the shield 10 is extended for use. The primary purpose of the casings is to conceal the mechanism and present a neat appearance at the sides of the wind shields.

When the device is to be used as a sun shield, the upper section 16 is moved outwardly into inclined position as shown in Fig. 9 and a translucent window curtain 37 preferably green in color, is mounted upon a roll 38, which latter is secured along the upper edge of the section 16, and is pulled downwardly and rearwardly of and in contact with the shield 16. At the lower end of the curtain 37 there is provided a hook 39 adapted to extend over the lower edge of the wind shield section 16 to hold the shade in place. With the curtain 37 and wind shield 16 thus disposed, in driving against the sun the eyes of the driver are protected against the glare and the vision of the driver through the wind shield is not interrupted.

The window frame of the shield section 16 is provided on its sides with channels 40 in which the side edges of the shade or curtain 37 engage when the shade is extended as shown in Fig. 9. The channels 40 prevent the wind from getting between the shade and wind shield and blowing the shade out of place or causing the same to rattle.

I claim:—

1. In combination with an automobile having a wind shield, of a frame hingedly connected with the wind shield and movable into vertical and inclined positions relative to said wind shield, a transparent wind shield carried by said frame and bars pivoted to and for supporting said frame with the wind shield therein in downwardly and outwardly inclined position relative to the first-named wind shield, shutter members pivotally and slidably associated with one another on opposite sides of said frame and arranged to inclose spaces on the sides of said frame when said frame is extended into inclined position, and hook members on said bars adapted to engage portions of the automobile wind shield to support the frame in operative position, certain of said shutters members having openings therein through which said hook members extend.

2. In combination with an automobile having a wind shield thereon, a frame hingedly connected at its upper end with the upper end of the wind shield, a transparent wind shield member supported in said frame, bars pivotally and slidably connected with said frame, said automobile having openings in the body arranged to receive the lower ends of the bars when said bars are in operative position and means independent of permanent connection with the automobile wind shield on the other ends of the bars adapted to coact with the main wind shield to support the frame in the outwardly and downwardly inclined position relative to the main wind shield.

3. In combination with an automobile having a wind shield and a frame therefor, of a storm shield comprising a frame hinged at one end to the first named frame and movable from a position parallel with said first-named frame to a position downwardly and outwardly inclined thereto, wind shield sections mounted in said second-named frame, bars pivotally and slidably connected at one end with the outer end portions of the second-named frame and being independent of any connection with said first-named frame and hook members carried on the other ends of said bars and arranged to engage the first-named frame so as to support the second named frame in operative position, and means for longitudinally adjusting said hook members relative to said bars.

4. In combination with an automobile having a wind shield, and a frame therefor, of a storm shield comprising a frame hinged at one end to the first-named frame and movable from a position parallel with said first-named frame and to a position downwardly and outwardly inclined thereto, wind shield sections mounted in said second-named frame, bars pivotally and slidably connected at one end with the outer end portions of the second-named frame and being independent of any connection with said first-named frame and hook members carried on the other ends of said bars and arranged to engage the first-named frame so as to support the second named frame in operative position, shutter members disposed at the ends of said second-named frame, certain of said shutter members having an opening therein receiving and supporting said hook members.

SHOICHI NAKAGAWA.